(12) United States Patent
Stern et al.

(10) Patent No.: US 8,171,349 B2
(45) Date of Patent: May 1, 2012

(54) ASSOCIATING A MONITORING MANAGER WITH AN EXECUTABLE SERVICE IN A VIRTUAL MACHINE MIGRATED BETWEEN PHYSICAL MACHINES

(75) Inventors: Richard Mark Stern, Saratoga, CA (US); James R. Curtis, Placerville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 48 days.

(21) Appl. No.: 12/818,582

(22) Filed: Jun. 18, 2010

(65) Prior Publication Data
US 2011/0314345 A1    Dec. 22, 2011

(51) Int. Cl.
*G06F 11/00* (2006.01)

(52) U.S. Cl. ....... 714/47.1; 714/4.1; 714/4.11; 714/4.12

(58) Field of Classification Search ............ 714/4.1, 714/4.11, 4.12, 47.1
See application file for complete search history.

(56) References Cited

U.S. PATENT DOCUMENTS

| 7,383,405 | B2 | 6/2008 | Vega |
| 7,660,867 | B2 | 2/2010 | Sakuta |
| 7,886,183 | B2 * | 2/2011 | Krishnan et al. ............ 714/5.11 |
| 2006/0036895 | A1 * | 2/2006 | Henrickson ................ 714/4 |
| 2007/0233828 | A1 * | 10/2007 | Gilbert ...................... 709/223 |
| 2009/0106409 | A1 | 4/2009 | Murata |
| 2009/0265707 | A1 | 10/2009 | Goodman |
| 2009/0313620 | A1 | 12/2009 | Sedukhin |
| 2010/0037089 | A1 * | 2/2010 | Krishnan et al. .............. 714/5 |
| 2010/0042988 | A1 | 2/2010 | Lundin |
| 2010/0325474 | A1 * | 12/2010 | Gopinath et al. .............. 714/4 |

OTHER PUBLICATIONS

Hyser et al., U.S. Appl. No. 11/588,607, filed Oct. 27, 2006 (29 pages).
Hyser et al., U.S. Appl. No. 12/260,787, filed Oct. 29, 2008 (19 pages).
Watson et al., U.S. Appl. No. 12/237,177, filed Sep. 24, 2008 (26 pages).
Hyser et al., U.S. Appl. No. 12/236,271, filed Sep. 23, 2008 (26 pages).
Hyser et al., U.S. Appl. No. 12/260,735, filed Oct. 29, 2008 (17 pages).
Hyser et al., U.S. Appl. No. 12/236,304, filed Sep. 23, 2008 (23 pages).
Watson et al., U.S. Appl. No. 12/236,244, filed Sep. 23, 2008 (22 pages).
HP, Using HP Serviceguard to manage HP Integrity Virtual Machines, HP Part No. T2767-90042 published Jun. 2006 (23 pages).
HP, Managing Serviceguard Fourteenth Edition, Part No. B3936-90117, Jun. 2007 (534 pages).

* cited by examiner

*Primary Examiner* — Charles Ehne

(57) ABSTRACT

A virtual machine is migrated from a source physical machine to a target physical machine, where the virtual machine has an executable service and a monitoring agent for monitoring the executable service. In response to the migrating, a monitoring manager is started that issues a command to start the executable service. It is determined whether the command is for the executable service that is already running in the migrated virtual machine. In response to such determining, the started monitoring manager is associated with the already running executable service, where the monitoring manager cooperates with the monitoring agent to detect fault of the executable service.

18 Claims, 4 Drawing Sheets

ASSOCIATING A MONITORING MANAGER WITH AN EXECUTABLE SERVICE IN A VIRTUAL MACHINE MIGRATED BETWEEN PHYSICAL MACHINES

BACKGROUND

Virtual machines can be provided in a computer to enhance flexibility and performance. A virtual machine typically refers to some arrangement of components (hardware and machine-readable instructions) for virtualizing or emulating an actual computer, where the virtual machine can include an operating system and software applications. Virtual machines can allow different operating systems (referred to as guest operating systems) to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed. By including multiple virtual machines in the computer, the hardware resources of the computer can be shared.

BRIEF DESCRIPTION OF THE DRAWINGS

Some embodiments are described with respect to the following figures.

DETAILED DESCRIPTION

Figure 1:
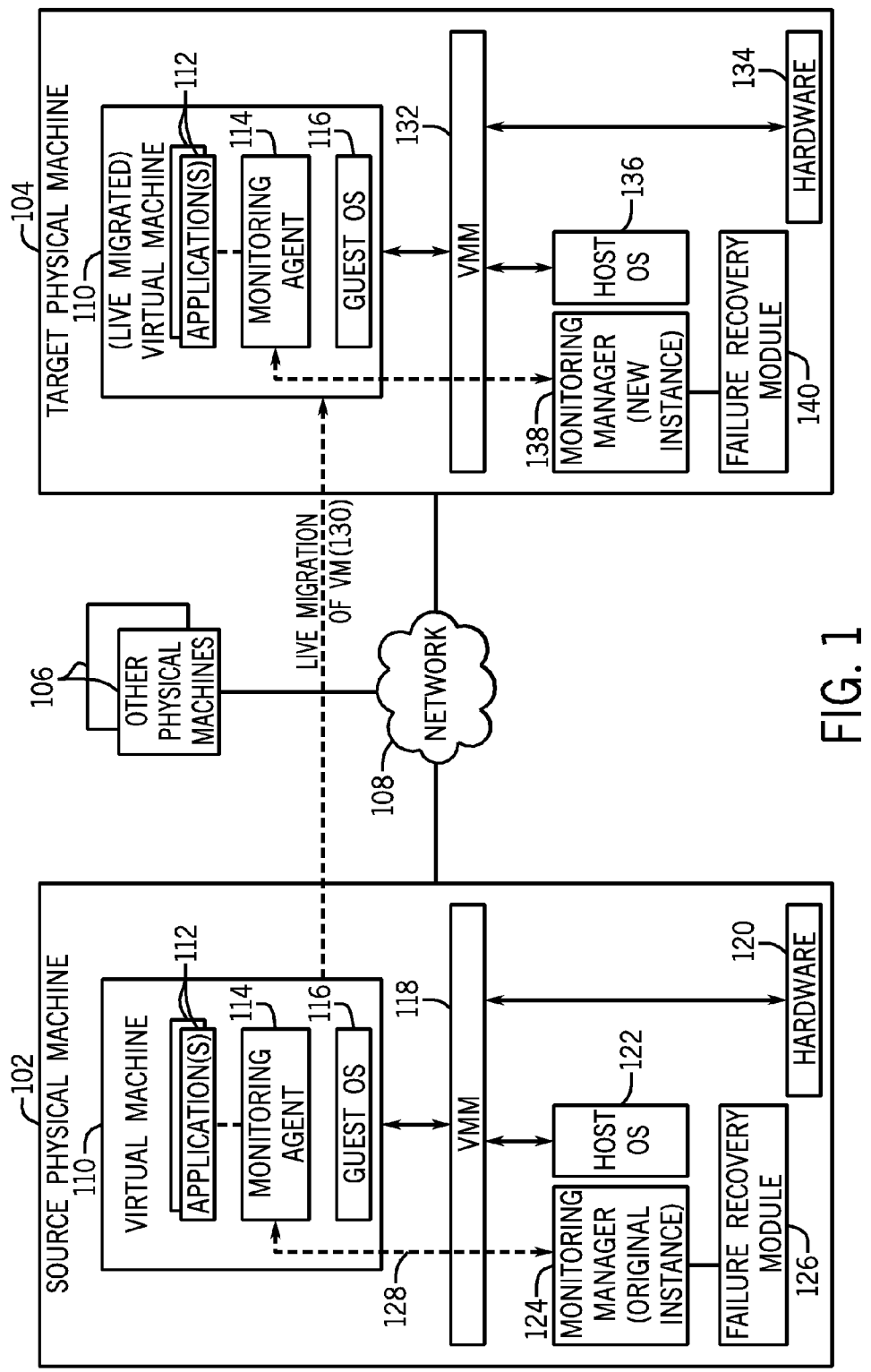
FIG. 1 is a block diagram of an example system incorporating some embodiments.

A virtual machine (VM) can be migrated from a source physical machine to a target physical machine for various reasons. For example, the source physical machine may have experienced a failure or other type of fault, which may prompt the virtual machine to be migrated from the source physical machine to the target physical machine. Alternatively, there may be excessive loading on one physical machine, where a relatively large number of processes may be executing, while another physical machine may be under-utilized. In such a scenario, to perform a load balancing, a virtual machine can be migrated from the over-loaded physical machine to the under-utilized physical machine. There can be other reasons for migrating a virtual machine between physical machines.

Examples of physical machines include computers (e.g., application servers, storage servers, web servers, etc.), communications modules (e.g., switches, routers, etc.), or other types of machines. "Physical machine" indicates that the machine is an actual machine made up of hardware and machine-readable instructions executable on the hardware. A virtual machine refers to some partition or segment (made up of hardware and/or machine-readable instructions) of the physical machine that is provided to virtualize or emulate a physical machine. From the perspective of a user or an application, a virtual machine looks just like a physical machine. A virtual machine appears as if the virtual machine is a stand-alone machine—in reality, the virtual machine is controlled by a program running on the host physical machine, where this program is sometimes referred to as a virtual machine monitor (VMM) or a hypervisor.

The VMM manages the sharing (by virtual machines) of physical resources, including hardware, of the physical machine on which the virtual machines are running. The VMM virtualizes the physical resources, including the hardware, of the physical machine. The VMM intercepts requests for resources from guest operating systems in respective virtual machines so that proper allocation of the physical resources of the physical machine can be performed. For example, the VMM can manage memory access, input/output (I/O) device access, CPU scheduling, and other tasks for the virtual machines. Effectively, the VMM provides an interface between the guest operating system of each virtual machine and the underlying physical resources of the physical machine. The interface provided by the VMM to a guest operating system of a virtual machine can emulate the interface provided by the physical resources of the physical machine. Alternatively, in other implementations, other types of interfaces can be provided by the VMM to guest operating systems in virtual machines.

One type of migration that can be performed by a virtual machine is a live migration. With live migration, a virtual machine can be transferred from a source physical machine to a target physical machine without having to stop and restart the migrated virtual machine. When a virtual machine is migrated, the state of the virtual machine is moved from the source physical machine to the target physical machine. The state of the virtual machine can include content of registers of hardware devices (e.g., CPUs, I/O devices, and so forth). The state of the virtual machine can also include data that is associated with the virtual machine, such as data in storage media accessed by the virtual machine during execution of the virtual machine in the physical machine.

To ensure proper operation in a virtual machine, a mechanism can be provided to monitor operation of executable services within the virtual machine. In some implementations, a monitoring agent can be provided in a virtual machine to monitor executable services within the virtual machine. An "executable service" refers to any process that can be run in the virtual machine, such as an application process, operating system process, and so forth. The monitoring agent in the virtual machine can interact with a monitoring manager outside the virtual machine for the purpose of indicating when an executable service has failed or experienced some other type of fault.

However, an issue associated with providing monitoring managers and monitoring agents for the purpose of monitoring for failure or other fault of executable services is that live migration of a virtual machine between a source physical machine and a target physical machine can cause an association between an executable service and a monitoring manager to be lost. After live migration, the monitoring manager may attempt to start another instance of an executable service in the live migrated virtual machine, even though an original instance of the executable service is continuing to run in the live migrated virtual machine. If a new instance of the executable service is started in the live migrated virtual machine, then the association between the original instance of the executable service in the live migrated virtual machine and the migration manager would be lost, such that the migration manager would no longer be able to monitor for failure or other fault of the original instance of the executable service in the live migrated virtual machine.

As a result of live migration of the virtual machine from the source physical machine to the target physical machine, a new instance of a monitoring manager is started, which can be on the target physical machine. The original instance of the monitoring manager, which can be on the source physical machine, can then be allowed to stop or shut down. Restarting the monitoring manager after live migration can cause the monitoring manager to attempt to restart certain executable services in the live migrated virtual machine. This is due to the fact that the monitoring manager is part of a "package" that is to be restarted upon migration of a virtual machine. This package can include various components, including the monitoring manager, applications, and so forth.

In some examples, the package is used in a clustering environment, in which clusters of physical machines are defined. A cluster of physical machines includes multiple physical machines that enable high availability of services run on such physical machines in the cluster. If one physical machine were to fail, experience another fault, or experience heavy loading, then the services can simply be provided by another physical machine, such as by migrating a virtual machine to a different physical machine. With high availability clustering, a package can be defined that specifies components that are to be restarted upon migration of a virtual machine between the physical machines of the cluster.

Although reference is made to high availability clusters, it is noted that in different implementations, techniques according to some embodiments can be utilized in other types of environments in which clusters are not used.

In accordance with some embodiments, a monitoring agent of a live migrated virtual machine is able to check to see if a monitoring manager is attempting to restart an executable service that is already running in the live migrated virtual machine. If the monitoring agent detects such a condition, the monitoring agent does not restart another instance of the executable service, but rather, associates the monitoring manager with the already running executable service in the live migrated virtual machine.

FIG. 1 is a block diagram of an example system that includes a source physical machine 102 and a target physical machine 104, as well as possibly other physical machines 106. The physical machines 102, 104, and 106 are connected to a network 108, which can be a local area network (LAN), a wide area network (WAN), a wireless network, the Internet, and so forth. The network 108 represents communications links as well as any routers or switches that allow for communication of data among the physical machines 102, 104, and 106, as well as other network devices connected to the network 108, such as client computers, personal digital assistants, and so forth.

The source physical machine 102 includes a virtual machine 110 prior to migration of the virtual machine. The virtual machine 110 includes one or multiple applications 112 which are executable in the virtual machine 110. The one or multiple applications 112 represent various processes that can be started in the virtual machine 110. Each application 112 represents an executable service that can be performed within the virtual machine 110.

As further depicted in FIG. 1, a monitoring agent 114 is provided in the virtual machine 110. The monitoring agent 114 is used for monitoring the application(s) 112 in the virtual machine 110, where the monitoring agent 114 is able to detect failure or other faults of the application(s) 112. The virtual machine 110 also includes a guest operating system 116.

A VMM 118 is provided between the virtual machine 110 and system components of the physical machine 102, which include a host operating system 122 and hardware 120. The hardware 120 includes a CPU (or multiple CPUs), storage media, I/O device(s), a network interface controller, and so forth. The network interface controller allows the source physical machine 102 to communicate over the network 108 with other devices.

As noted above, the VMM 118 provides an interface between the guest operating system 116 of the virtual machine 110 and the underlying hardware 120. Although just one virtual machine 110 is shown in the source physical machine 102 of FIG. 1, it is noted that the source physical machine 102 can further include additional virtual machine (s). The VMM 118 is also interposed between these additional virtual machine(s) and the hardware 120.

In some implementations, the source physical machine 102 also includes a monitoring manager 124, which cooperates with the monitoring agent 114 in the virtual machine 110 for detecting a failure or other fault of the application(s) 112 in the virtual machine 110. In FIG. 1, the monitoring manager 124 in the source physical machine 102 is indicated as an "original instance" of the monitoring manager due to the fact that after migration of the virtual machine 110, another instance of the monitoring manager is started, as discussed further below.

In some examples, the monitoring manager 124 is able to send polling requests to the monitoring agent 114 to poll the status of the application(s) 112. The polling request can be repeatedly sent, such as on a periodic or other intermittent basis. In response to each polling request, the monitoring agent 114 provides status information regarding the application(s) 112. Based on the status information, the monitoring manager 124 is able to determine whether any application 112 has experienced a fault. If a fault is detected, the failure recovery module 126 can be invoked by the monitoring manager 124 to take steps to address the fault.

In alternative implementations, instead of the monitoring manager 124 sending polling requests to the monitoring agent 114 to retrieve status information of the application(s) 112, the monitoring agent 114 can repeatedly (e.g., periodically or intermittently) send status information to the monitoring manager 124 without the monitoring manager 124 sending polling requests.

As depicted in FIG. 1, the interaction between the monitoring manager 124 and the monitoring agent 114 is over a path indicated by dashed line 128. In some cases, the path 128 can also go through the host operating system 122.

FIG. 1 further shows a failure recovery module 126, which is able to perform failure recovery in case of failure or other fault detection indicating that an application 112 has failed or experienced another fault.

FIG. 1 also shows live migration (130) of the virtual machine 110 from the source physical machine 102 to the target physical machine 104. After live migration of the virtual machine 110, the virtual machine 110 no longer runs on the source physical machine, but rather, runs on the target physical machine. Prior to the live migration, the virtual machine 110 does not run on the target physical machine 104.

As noted above, live migration of a virtual machine means that the virtual machine is not stopped at the source physical machine and restarted on the target physical machine. Rather, the virtual machine 110 continues to run even as the virtual machine 110 is migrated from the source physical machine 102 to the target physical machine 104. There may be a pause of the virtual machine 110 as the state of the virtual machine 110 is moved from the source physical machine 102 and the target physical machine 104.

Once the virtual machine 110 has been live migrated to the target physical machine 104, the live migrated virtual machine 110 interacts with a host operating system 136 and hardware 134 of the target physical machine 104 through a VMM 132 in the target physical machine 104. The hardware 134 of the target physical machine can have similar components as the hardware 120 of the source physical machine.

Note that as a result of the live migration of a virtual machine 110, a new instance of a monitoring manager 138 is started on the target physical machine 104. This new instance of the monitoring manager 138 is distinct from the original instance of the monitoring manager 124 in the source physical machine 102.

As a result of the monitoring manager 138 restarting in the target physical machine 104, the new instance of the monitoring manager 138 attempts to restart the application(s) 112 in the live migrated virtual machine 110. This can be accomplished by the new instance of the monitoring manager 138 issuing one or multiple commands (e.g., in the form of one or multiple command lines) to the monitoring agent 114 in the virtual machine 110. However, as noted above, in accordance with some implementations, the monitoring agent 114 is able to check whether application(s) 112 to be started is (are) already running in the live migrated virtual machine 110. If so, the monitoring agent 114 does not restart the application(s) 112, but rather, the monitoring agent 114 simply associates the new instance of the monitoring manager 138 with the already running application(s) 112.

Note that the original instance of the monitoring manager 124 on the source physical machine 102 is allowed to be closed or shut down. The target physical machine 104 also includes a failure recovery module 140 that is used for performing failure or other fault recovery in case of detecting a failure or fault of the application(s) 112.

Although the original instance of the monitoring manager 124 and the new instance of the monitoring manager 138 are depicted as running in the source physical machine 102 and target physical machine 104, respectively, the monitoring manager 124 or 138 can be executed on a different physical machine (one of the other physical machines 106, for example), in alternative implementations. In the scenario where the monitoring manager is running on a particular physical machine (different from the source or target physical machine depicted in FIG. 1), it is possible that this particular physical machine may fail or experience some other fault. As a result, the monitoring manager would be restarted on a different physical machine (which can be one of the source and target physical machines of FIG. 1 or another physical machine), and this restarted physical machine attempts to restart the application(s) 112 in the virtual machine 110. However, similar to the procedure discussed above, the monitoring agent 114 in the virtual machine 110 is able to check whether application(s) 112 to be started is (are) already running in the live migrated virtual machine 110. If so, the monitoring agent 114 does not restart the application(s) 112, but rather, the monitoring agent 114 simply associates the new instance of the monitoring manager 138 with the already running application(s) 112.

Figure 2:
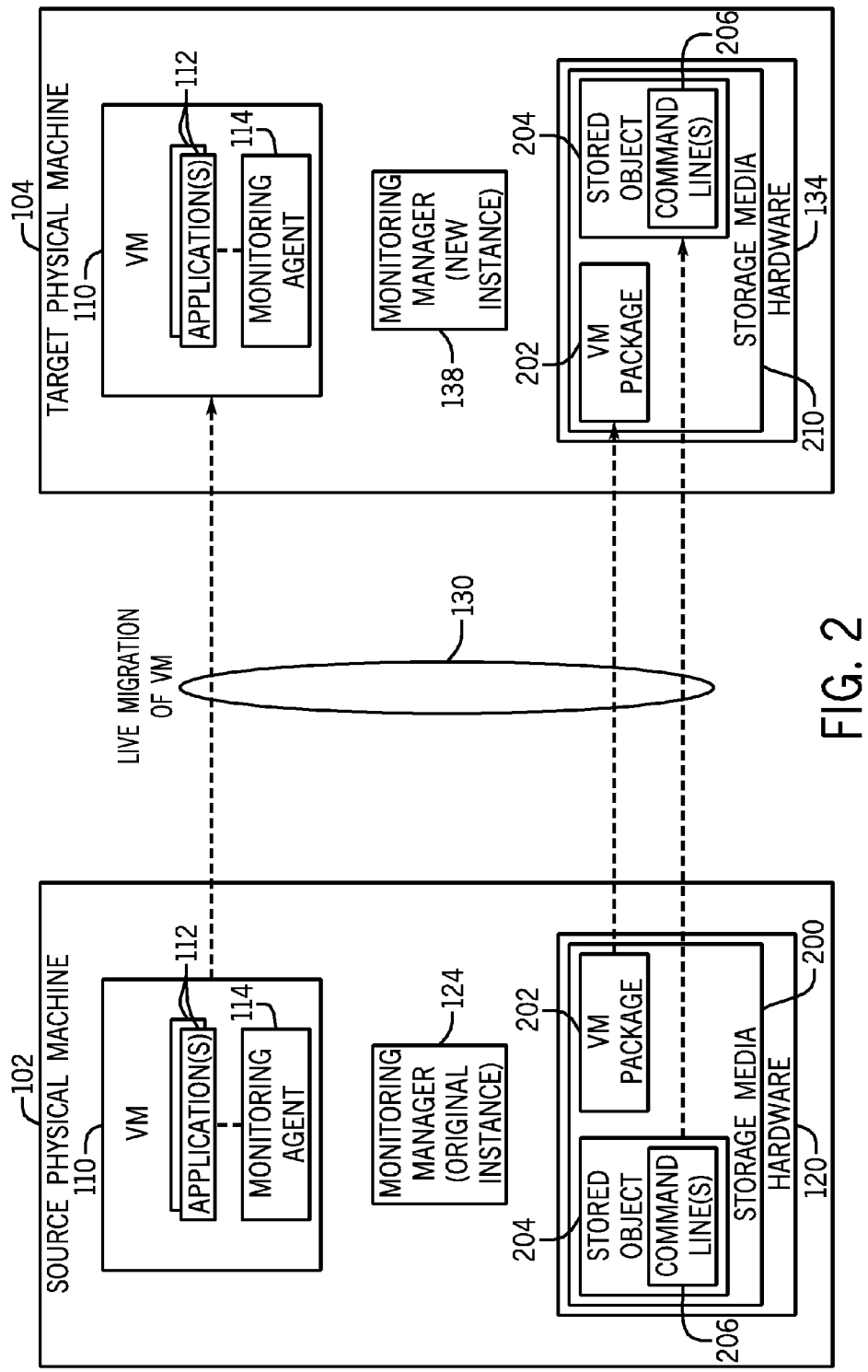
FIG. 2 is block diagram of an example system to illustrate migration of a virtual machine according to some embodiments.

FIG. 2 shows further details regarding elements employed for live migration of the virtual machine 110, according to further embodiments. As depicted in FIG. 2, the hardware 120 of the source physical machine 102 has storage media 200, which can include non-persistent memory and/or persistent storage device(s), such as disk-based storage device(s) or integrated circuit storage device(s). The storage media 200 stores a VM package 202 that contains components associated with the virtual machine 110 that are to be run on a physical machine. Examples of such components include the virtual machine itself, the application(s) 112, the monitoring agent 114, and the monitoring manager 124.

The storage media 200 also stores a stored object 204 that contains information collected by the monitoring agent 114. For example, the monitoring agent 114 can store status information associated with the application(s) 112 collected by the monitoring agent 114, such that the monitoring agent 114 can respond to the monitoring manager 124 with status information of the application(s) 112 in response to a polling request. In accordance with some implementations, the stored object 204 also contains command lines 206 that have been issued by the original instance of the monitoring manager 124 to start the application(s) 112. Each command line identifies an application 112 that has been started in the virtual machine 110.

In some examples, the stored object 204 is considered to be part of the memory of the monitoring agent 114 that is located within the virtual machine 110.

As depicted in FIG. 2, as part of the live migration (130) of the virtual machine 110, the VM package 202 and stored object 204 are moved from the source physical machine 102 to a storage media 210 in the hardware 134 of the target physical machine 104. At the target physical machine 104, the target physical machine 104 uses the content of the VM package 202 to start corresponding components associated with the virtual machine 110. Since the target physical machine 104 recognizes that the virtual machine 110 has been live migrated, the target physical machine 104 does not restart the virtual machine 110 and the components in the virtual machine 110. However, the new instance of the monitoring manager 138 is started based on the VM package 202. This new instance of the monitoring manager 138 sends command line(s) to the monitoring agent 114 to start corresponding application(s) 112.

In response to receiving such command line(s) issued by the new instance of the monitoring manager 138, the monitoring agent 114 of the live migrated virtual machine 110 at the target physical machine 104 compares the received command line(s) from the monitoring manager 138 to the command line(s) 206 contained in the stored object 204 that has been copied to the target physical machine 104. If a match is detected between the command line(s) received from the new instance of the monitoring manager 138 and the command line(s) 206 in the stored object 204, then the monitoring agent 114 knows that the corresponding application(s) 112 is (are) already running in the live migrated virtual machine 110 and should not be restarted. Instead, the monitoring agent 114 associates the application(s) already running in the virtual machine 110 with the new instance of the monitoring manager 138, such that the new instance of the monitoring manager 138 is able to poll for status information of the application(s) 112 in the live migrated virtual machine 110.

By using some implementations, live migration of a virtual machine can be performed while maintaining association between a new instance of a monitoring manager and executable services already running in the live migrated virtual machine 110. Such association can be maintained without having to modify the content of the VM package 202, and without having to provide some special notification to the new instance of the monitoring manager 138 that a live migration has taken place. As a result, support for continued monitoring of components of the live migrated virtual machine can be accomplished with reduced amount of changes that have to be made to an existing infrastructure.

Figure 3:
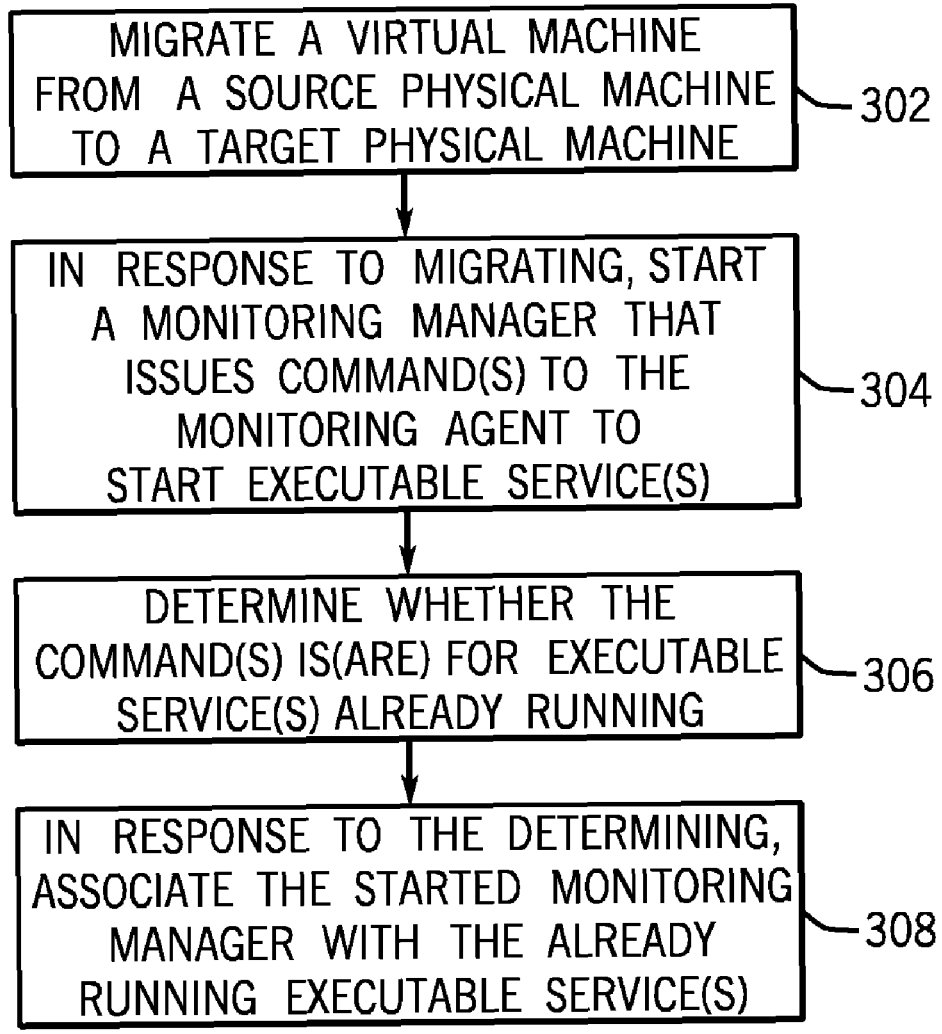
FIGS. 3 and 4 are flow diagrams of performing migration of a virtual machine, according to various embodiments.

FIG. 3 is a flow diagram of a process of performing live migration of a virtual machine, according to some embodiments. The virtual machine is migrated (at 302) from a source physical machine (102) to a target physical machine (104). In response to the migrating, a new instance of a monitoring manager (138) is started that issues command(s) to the monitoring agent (114) in the live migrated virtual machine (110) to start executable service(s), such as the application(s) 112 shown in FIG. 1 or 2. In response to the command(s), the monitoring agent (114) determines (at 306) whether the command(s) is (are) for executable service(s) already running. In response to determining that the command(s) is (are) for executable service(s) already running in the live migrated virtual machine, the monitoring agent associates (at 308) the started new instance of the monitoring manager (138) with the already running executable service(s) in the migrated virtual machine. As a result, the new instance of the monitoring manager (138) is able to cooperate with the monitoring agent (114) of the live migrated virtual machine on the target physical machine 104 to detect fault of one or both of the executable service(s) in the migrated virtual machine (110).

Figure 4:
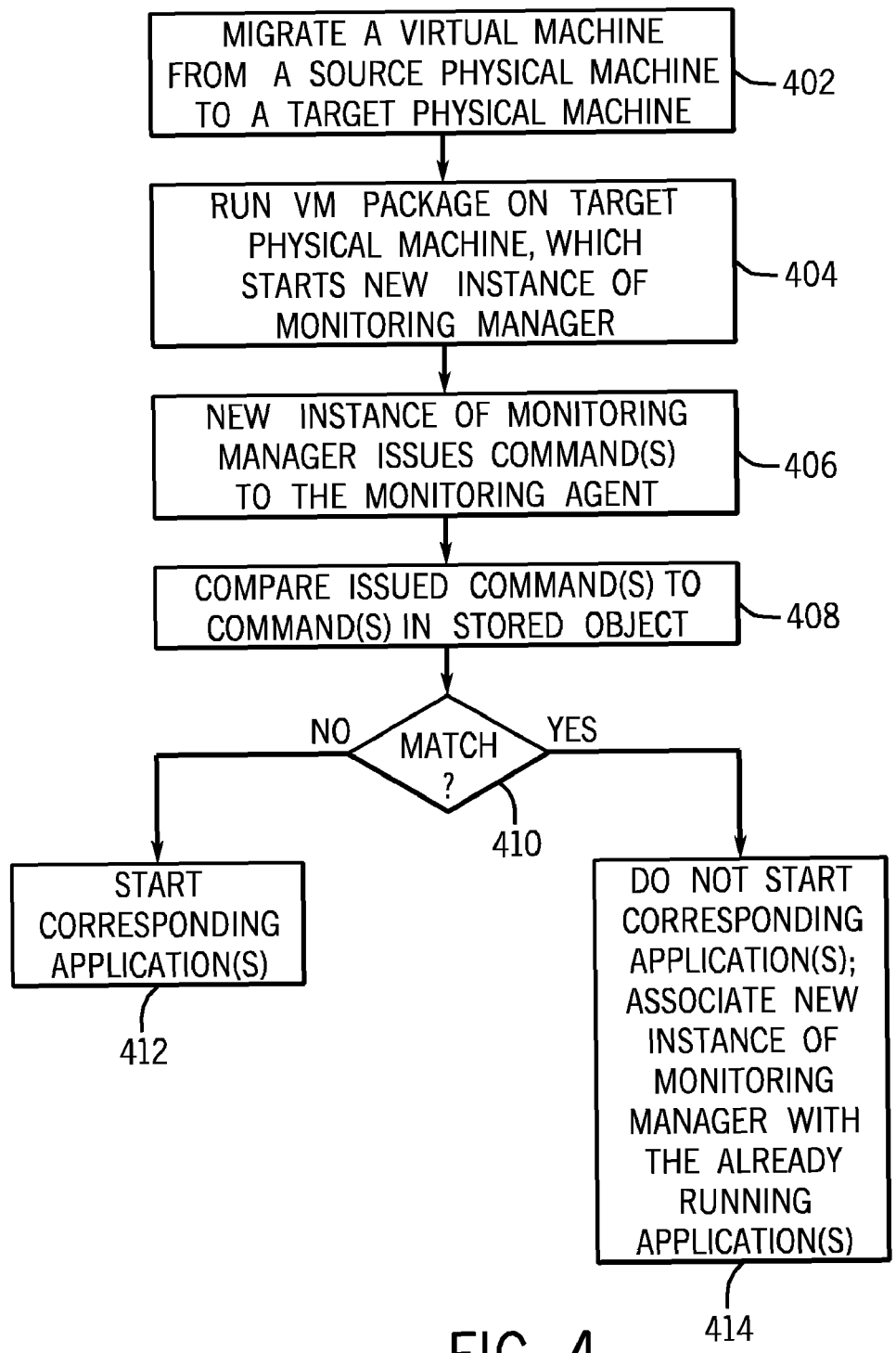

FIG. 4 is a flow diagram of a process according to alternative implementations. Reference is made to components depicted in FIG. 2. A virtual machine (110) is live migrated (at 402) from a source physical machine (102) to a target physical machine (104). As a result of the migration, a VM package (202), which has been copied from the source physical machine to the target physical machine, is run (at 404) on the target physical machine. Running the VM package on the target physical machine starts a new instance of the monitoring manager (138) that is identified in the VM package.

The new instance of the monitoring manager (138) issues (at 406) command line(s) to the monitoring agent (114) of the live migrated virtual machine (110) that is now on the target physical machine (104). The monitoring agent 114 compares (at 408) the issued command line(s) to the command line(s) (206) contained in the stored object (204). If a match is detected, then the corresponding application(s) (112) is (are) not started, but rather, the new instance of the monitoring manager (138) is associated (at 414) with the already running application(s). On the other hand, if there is no match between the issued command line(s) and the command line(s) in the stored object (204), then the corresponding application(s) specified in the command line(s) is (are) started (at 412).

The various modules depicted in FIG. 1 or 2, such as the virtual machine 110, application(s) 112, monitoring agent 114, guest operating system 116, VMM 118 or 132, monitoring manager 124 or 138, host operating system 122 or 136, and a failure module 126 or 140, can be implemented with machine-readable instructions. The machine-readable instructions can be loaded for execution on a processor (or multiple processors). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   migrating, to a target physical machine from a source physical machine, a virtual machine having an executable service and a monitoring agent for monitoring the executable service, wherein the executable service continues to run after the migrating;
   in response to the migrating, starting a monitoring manager that issues a command to start the executable service;
   determining whether the command is for the executable service that is already running in the migrated virtual machine, wherein the determining comprises:
      the monitoring agent in the migrated virtual machine checking information stored prior to the migrating, wherein the stored information includes a particular command to start the executable service received by the monitoring agent prior to the migrating, and
      comparing the command issued by the started monitoring manager with the particular command; and
   in response to the determining, associating the started monitoring manager with the already running executable service in the migrated virtual machine, wherein the monitoring manager cooperates with the monitoring agent to detect fault of the executable service.

2. The method of claim 1, wherein starting the monitoring manager comprises starting the monitoring manager at the target physical machine.

3. The method of claim 2, wherein a previous instance of the monitoring manager existed at the source physical machine prior to the migrating.

4. The method of claim 1, wherein migrating the virtual machine comprises live migrating the virtual machine that causes the virtual machine to be transferred from the source physical machine to the target physical machine without having to shut down the virtual machine.

5. The method of claim 1, further comprising:
   the monitoring manager repeatedly receiving status information from the monitoring agent; and
   determining whether the executable service has experienced a fault based on the received status information.

6. The method of claim 1, further comprising:
   in response to detecting that the command issued by the started monitoring manager matches the particular command, performing the associating and avoiding restarting another instance of the executable service.

7. The method of claim 1, wherein the source and target physical machines are part of a high availability cluster of physical machines.

8. A method comprising:
   migrating, to a target physical machine from a source physical machine, a virtual machine having an executable service and a monitoring agent for monitoring the executable service, wherein the executable service continues to run after the migrating;
   in response to the migrating, starting a monitoring manager that issues a command to start the executable service, wherein starting the monitoring manager comprises starting the monitoring manager on a first particular physical machine different from the source and target physical machines;

determining whether the command is for the executable service that is already running in the migrated virtual machine;

in response to the determining, associating the started monitoring manager with the already running executable service in the migrated virtual machine, wherein the monitoring manager cooperates with the monitoring agent to detect fault of the executable service;

restarting the monitoring manager on a second particular physical machine different from the first particular physical machine;

receiving a particular command to start the executable service from the monitoring manager on the second particular physical machine;

further determining whether the particular command is for the executable service that is already running in the virtual machine; and in response to the further determining, associating the restarted monitoring manager with the already running executable service in the virtual machine.

9. A system comprising:

a source physical machine;

a target physical machine having a virtual machine migrated from the source physical machine, wherein the virtual machine contains an executable service and a monitoring agent for monitoring the executable service; and a monitoring manager to issue a command to start the executable service as a result of the migration of the virtual machine, wherein the monitoring agent is responsive to the command to avoid starting a new instance of the executable service in response to the monitoring agent determining that the executable service is already running in the virtual machine after the migration, and wherein the monitoring manager is to cooperate with the monitoring agent in the migrated virtual machine to monitor a status of the executable service.

10. The system of claim 9, wherein the target physical machine has storage media to store a package copied from the source physical machine in connection with the migration of the virtual machine, wherein the package is to be run on the target physical machine in response to the migration of the virtual machine, and wherein the monitoring manager is to be started based on running of the package.

11. The system of claim 9, wherein the target physical machine comprises storage media to store an object copied from the source physical machine in connection with the migration of the virtual machine, wherein the object contains a particular command for starting the executable service in the virtual machine issued prior to the migration of the virtual machine from the source physical machine to the target physical machine.

12. The system of claim 11, wherein the monitoring agent is to compare the command from the monitoring manager with the particular command in the object to determine whether the executable service is already running in the virtual machine after the migration.

13. The system of claim 9, wherein the migration of the virtual machine from the source physical machine to the target physical machine is a live migration in which the virtual machine is transferred from the source physical machine to the target physical machine without stopping the virtual machine.

14. The system of claim 9, wherein the monitoring manager is to receive status information of the executable service from the monitoring agent to allow the monitoring manger to determine a status of the executable service in the migrated virtual machine.

15. The system of claim 14, wherein the monitoring manager is to repeatedly send polling requests to the monitoring agent in the migrated virtual machine for monitoring the status of the executable service.

16. The system of claim 14, wherein the target physical machine further comprises a failure recovery module executable to handle a fault of the executable service detected by the monitoring manager.

17. The system of claim 9, further comprising a virtual machine monitor, wherein the monitoring manager is to communicate with the monitoring agent for monitoring a status of the executable service through the virtual machine monitor.

18. An article comprising at least one machine-readable storage medium storing instructions that upon execution cause a target physical machine to:

start, at the target physical machine, a virtual machine live migrated from a source physical machine, wherein the live migrated virtual machine includes an executable service and a monitoring agent to collect status information of the executable service;

based on information associated with the live migrated virtual machine copied from the source physical machine, start a new instance of a monitoring manager at the target physical machine, wherein an original instance of the monitoring manager executed on the source physical machine prior to the migration of the virtual machine from the source physical machine to the target physical machine;

issue, by the new instance of the monitoring manager, a command to start an executable service;

compare, by the monitoring agent, the command from the new instance of the monitoring manager with a command that is part of the information copied from the source physical machine to determine whether the executable service of the command is already running in the migrated virtual machine;

in response to a match between the command from the new instance of the monitoring manager and the command contained in the information copied from the source physical machine, associate the new instance of the monitoring manager with the executable service in the migrated virtual machine.

\* \* \* \* \*